May 7, 1957 J. DODD 2,791,433
DEVICE FOR THE ATTACHMENT OF TOOLS, FOR
TAPPING AND STUDDING OPERATIONS TO
POWER OPERATED DRILLING MACHINES
Filed Nov. 20, 1953 2 Sheets-Sheet 1
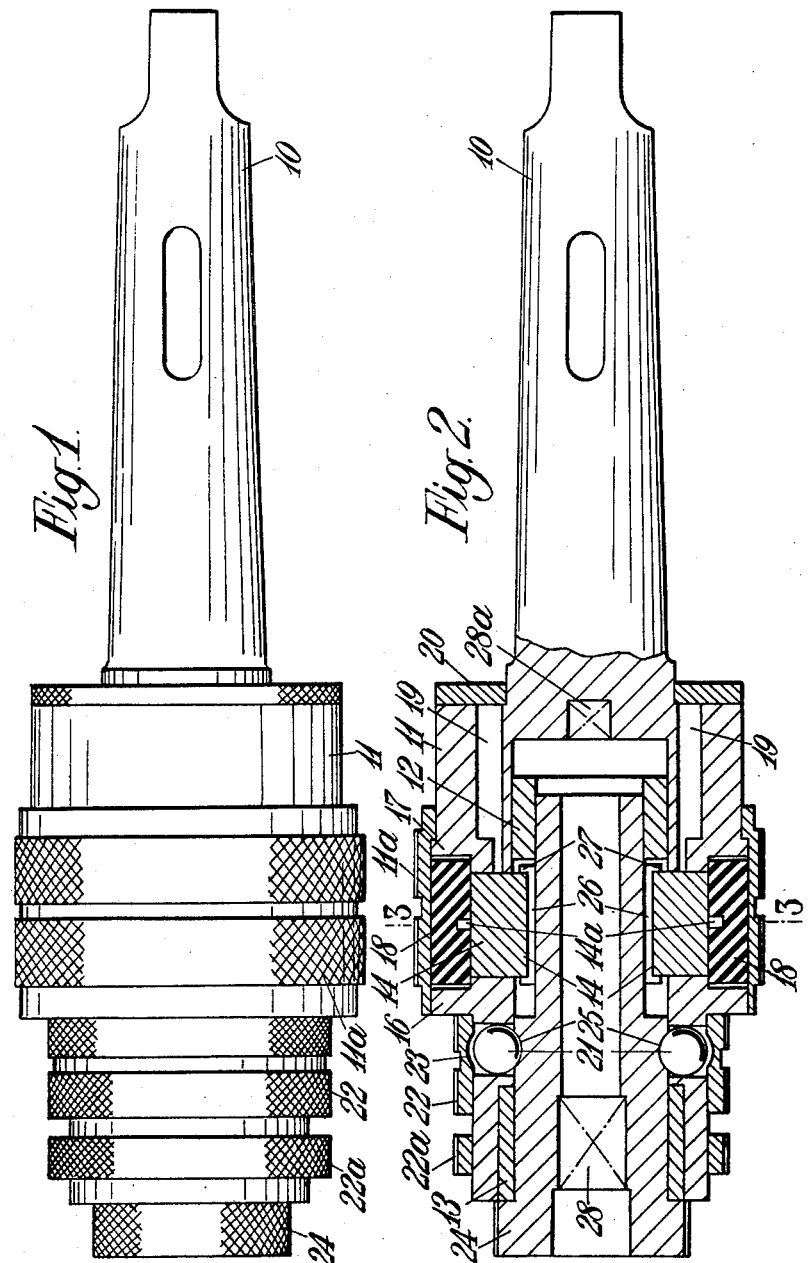
Inventor
J. Dodd

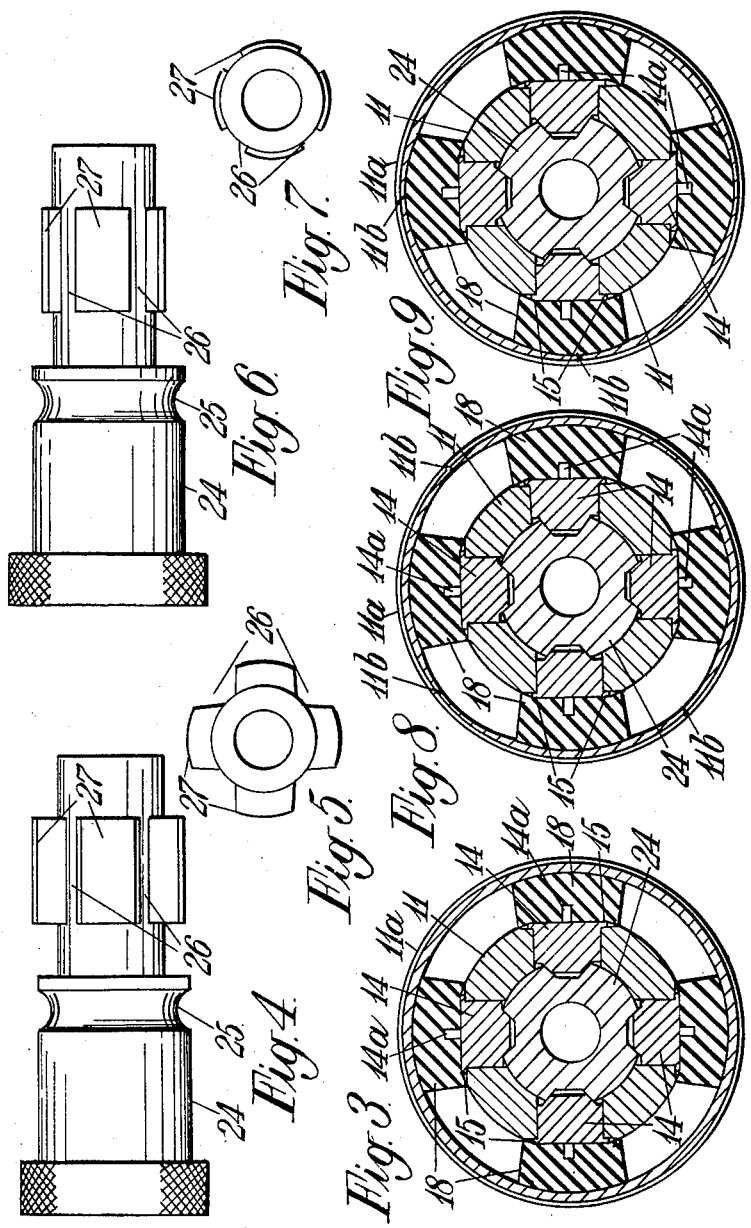

United States Patent Office 2,791,433
Patented May 7, 1957

2,791,433

DEVICE FOR THE ATTACHMENT OF TOOLS, FOR TAPPING AND STUDDING OPERATIONS TO POWER OPERATED DRILLING MACHINES

John Dodd, Greenock, Scotland

Application November 20, 1953, Serial No. 393,458

Claims priority, application Great Britain November 27, 1952

1 Claim. (Cl. 279—79)

This invention has reference to devices for the attachment of tools for tapping and studding operations to power-operated drilling machines.

Devices for the purpose have been provided with a slipping clutch which slips when the tool encounters abnormal resistance so that the tool is not rotated.

The present invention has for its object to provide a device of this kind which will be more compact and light than such devices as heretofore constructed.

Further in such devices as heretofore constructed the loading on the clutch members had to be varied in accordance with the size of the tool being used and another object of the invention is to provide improvements whereby the loading can remain unaltered when using various sizes of tools.

A still further object of the invention is to provide a device of this kind wherein the loading on the clutch members can be easily varied.

A preferred embodiment of the invention will now be described with reference to the annexed drawings wherein:

Figure 1 is an elevation of the device;
Figure 2 is a sectional elevation thereof;
Figure 3 is a section on the line 3—3 of Figure 2;
Figure 4 is an elevation of an adaptor complete with driven clutch member;
Figure 5 is an end view of Figure 4 looking to the left;
Figures 6 and 7 are views corresponding to Figures 4 and 5 respectively but showing a clutch member with much shallower teeth forming the driven clutch member, and
Figures 8 and 9 are sections corresponding to Figure 3 but showing a construction by which the loading on the driving clutch members can be easily and quickly altered.

The attachment device illustrated comprises a tapered shank 10 for attachment to a drilling or like machine and which shank has formed integral therewith or has secured thereto a cylindrical casing 11 which at its end adjacent to the shank and at its end remote therefrom is provided with bearing bushes 12 and 13 respectively.

The wall of the cylindrical casing is provided with longitudinally extending slots, say four in number, equally spaced circumferentially, and in each slot is fitted an axially extending driving clutch member 14, the opposite sides of which are inclined at an angle of about 45° with respect to the inner face thereof. The outer faces of said members are provided with projecting flanges 15 which bear on seats on the outer face of the cylindrical casing.

The cylindrical casing is provided with two external flanges 16 and 17, which flanges together with said casing and an outer sleeve 11ᵃ form a chamber in which are a number of rubber or like pads 18 which bear on the said clutch members 14 so as to urge them radially inwards.

Each member 14 is provided with a locating pin 14ᵃ which fits into a hole in the pad bearing thereon.

The cylindrical casing at its end adjacent to the shank is provided with a number of axially extending bores 19 which constitute lubricant chambers, their outer ends being closed by a removable cover plate 20 and their inner ends discharging into the slots containing the clutch members 14.

Towards its other end the cylindrical casing is provided with holes in the wall thereof and in said holes steel balls 21 are inserted. A knurled sleeve 22 snugly encloses the cylinder and is internally recessed as at 23 in such manner that in one position of the sleeve the balls are forced radially inwards and in another position thereof the balls can move radially outwards, the sleeve being shown in the latter position. A retaining ring 22ᵃ on the outer end of the cylindrical casing prevents the sleeve being drawn off the casing.

The tool carrying socket or adaptor 24 is provided with annular bearing faces to fit into the two bearings 12 and 13 and is also provided with an annular recess 25 to receive the balls 21 by which accidental axial displacement of the adaptor is prevented. The said adaptor is provided with axial slots 26 which receive the aforesaid clutch members. Said slots form therebetween very broad teeth 27 which together form the driven member.

The outer end of the adaptor is provided with internal flat faces 28 to receive the squared end of a tapping tool.

When the attachment device is fitted to a drilling machine and an adaptor or tool carrying socket with tool is fitted in the cylinder the drive of the machine is transmitted through the clutch members to the adaptor and tool. Should the tool encounter abnormal resistance the driving clutch members 14 will be forced radially outwards against the action of the rubber or like pads 18 so that said members will override the recesses in the tool carrying adaptor and no drive will be transmitted to the latter. The tool carrying adaptor or socket extends through the cylinder and the resiliently loaded clutch members are disposed around the sides thereof. In consequence the clutch members do not add to the overall dimensions of the device so that the latter is more compact and is lighter than such devices as heretofore constructed.

An adaptor or tool carrying socket for a smaller tool will have shallower recesses 26 so that with correspondingly less resistance the clutch members will slip.

Thus while the shank remains fast on the drilling machine the operator, in order to effect a different tapping operation, has merely to remove the adaptor or tool carrying socket therein and fit another adaptor socket with an appropriate tool and recesses 26 to correspond therewith.

In the construction shown in Figuers 8 and 9 the internal wall of the sleeve is provided with four shallow recesses 11ᵇ. Said recesses, when the sleeve is in the position shown in Figure 8, register with the gaps between adjacent pads 18 and the pads exert the maximum loading on the driving clutch members, this being required when the tool is operating on hard metals. By rotating the sleeve 45° to the position shown in Figure 9 the recesses are brought directly over the pads and in consequence the loading exerted by the pads 18 on the driving clutch members is reduced, this being desirable when the tool is operating on relatively soft metals.

If desired the cylinder at its inner end may be provided with a diametrical slot 28a with which is adapted to engage the end of a tool carrying socket not provided with recesses to receive the clutch members. Consequently when performing drilling, reaming, boring and countersinking operations wherein a positive feed is imparted to the tool the operator has merely to fit in the cylinder one of said tool carrying sockets with appropriate tool, the socket being positively rotated irrespective of the resistance encountered.

If desired leaf, blade or other metal springs may be substituted for the rubber pads, and such springs may extend circumferentially or longitudinally of the cylinder.

What I claim is:

A device for the attachment of tools for tapping and studding operations to power-operated drilling machines comprising a shank for attachment to the drilling or like machine, a cylinder carried by said shank and having holes in the wall thereof, resiliently loaded clutch members provided in said holes and projecting into the interior of the cylinder, resilient means located in said holes and bearing on the clutch members, an outer cylindrical sleeve enclosing the cylinder and bearing on the resilient means to maintain them in a state of compression, such sleeve being provided with a plurality of internal recesses, one for each of said resilient means, which recesses, by imparting a partial rotary movement to the sleeve, enable the loading on the driving members to be varied, and a tool-carrying socket extending into and journalled in bearings within the cylinder, said socket being provided with a driven clutch member with which the resiliently loaded clutch members are arranged to engage in such manner that abnormal resistance to the rotation of the tool results in the resiliently loaded clutch members yielding radially outwards so that no drive is transmitted to the tool.

References Cited in the file of this patent

UNITED STATES PATENTS

| | | |
|---|---|---|
| 1,548,427 | Aldeen | Aug. 4, 1925 |
| 1,611,940 | Ohmer | Dec. 28, 1926 |
| 1,805,692 | Ferenci | May 19, 1931 |
| 2,038,466 | Yates | Apr. 21, 1936 |
| 2,140,255 | Rieske | Dec. 13, 1938 |
| 2,164,485 | Yantis | July 4, 1939 |
| 2,344,673 | Brown | Mar. 21, 1944 |
| 2,523,584 | Miller | Sept. 26, 1950 |
| 2,540,513 | Dodd | Feb. 6, 1951 |
| 2,546,633 | Dodge | Mar. 27, 1951 |
| 2,692,486 | Anderson | Oct. 26, 1954 |